(12) United States Patent
Lancaster et al.

(10) Patent No.: US 6,229,546 B1
(45) Date of Patent: May 8, 2001

(54) RAPID TERRAIN MODEL GENERATION WITH 3-D OBJECT FEATURES AND USER CUSTOMIZATION INTERFACE

(75) Inventors: J. Justin Lancaster, Lexington; Christopher J. Bell, Somerville, both of MA (US)

(73) Assignee: Geosoftware, Inc., Lexington, MA (US)

( * ) Notice: Subject to any disclaimer, the term of this patent is extended or adjusted under 35 U.S.C. 154(b) by 0 days.

(21) Appl. No.: 09/149,475

(22) Filed: Sep. 8, 1998

Related U.S. Application Data

(60) Provisional application No. 60/058,255, filed on Sep. 9, 1997.

(51) Int. Cl.[7] .................................................. G06T 17/00
(52) U.S. Cl. .......................... 345/419; 345/427; 345/429
(58) Field of Search ..................................... 345/418, 419, 345/420, 423, 424, 425, 427, 429, 430, 431

(56) References Cited

U.S. PATENT DOCUMENTS

| | | | |
|---|---|---|---|
| 4,970,682 | 11/1990 | Beckwith, Jr. et al. | 364/900 |
| 5,053,778 | 10/1991 | Imhoff | 342/191 |
| 5,140,532 | 8/1992 | Beckwith, Jr. et al. | 395/101 |
| 5,179,638 | 1/1993 | Dawson et al. | 395/125 |
| 5,359,526 | 10/1994 | Whittington et al. | 364/443 |

*Primary Examiner*—Cliff N. Vo
(74) *Attorney, Agent, or Firm*—Hamilton, Brook, Smith & Reynolds, P.C.

(57) ABSTRACT

A method and system 5 for generating a three-dimensional world model for simulated real terrain optimized for a personal computer. Terrain data and other environmental data are acquired from at least one of a plurality of digital data sources 9 through an acquisition step 20 and the acquired data are processed in a transformation and formatting step 25 to construct a predetermined intermediate database format 30, from which intermediate database, in response to a user query 40, introduced through a query interface program 45 that is visible on a personal computer monitor 11, the data are further extracted, processed and composited in a formatting step 32 to create a three-dimensional world model file 35. The 3-D world model format 35 is optimized for a particular imaging system, preferably a browser that renders standard Virtual Reality Modeling Language 2.0 specification files, that allows the 3-D model to be viewed and navigated on the computer monitor 11. In formatting step 32 the terrain surface can be colored and textured automatically by the system corresponding to geographic database layers, and natural and man-made structures can be made to populate the terrain skin as 3-D objects in the composited world model 35. The method and system 5 allow a personal computer user to query the system for any geographic location for which source data are available and to adjust the geographic extent of the 3-D world 35 per the user's preference aided by expert system guidance.

33 Claims, 5 Drawing Sheets

RAPID TERRAIN MODEL GENERATION WITH 3-D OBJECT FEATURES AND USER CUSTOMIZATION INTERFACE

RELATED APPLICATION

This application claims priority to Provisional Patent Application No. 60/058,255, filed Sep. 9, 1997, the entire teachings of which are incorporated herein by reference.

BACKGROUND

1. Field

The invention relates to environmental visualization and modeling simulation systems, and to environmental impact assessment systems, and particularly to a method and system for generating a 3-D world model for simulated real terrain optimized for a personal computer.

2. Description of Related Art

Environmental systems modeling has proven to be an effective method for both teaching about the natural environment and about environmental processes and for estimating potential environmental and socio-economic impacts of environmental changes introduced by human activities. The creation of such an environmental model typically begins with real-world source data that has been derived by environmental survey and monitoring activities, including U.S. Geological Survey information or a data collected by another mapping agency or university. The modeling activity typically involves setting the initial state of various parameters and stepping the model through computations that relate the parameters to process interactions between environmental components, such as setting the parameter for water level of a lake and relating that water level to a precipitation process that interacts between the atmosphere and the lake whereby the lake water level is increased. Three-dimensional transport of energy, momentum, chemical species and other interactions between various environmental or ecological state properties are relevant and useful to these modeling activities. "Running" an environmental model consists of stepping computationally through a series of process instructions, iteratively if required, where the steps correspond to time intervals and the degree of potential environmental change corresponds to the simulated length of time from start of the simulation to its termination. For instance, in a series of computations that takes the computer fifteen seconds to execute an environmental model might simulate the effects of a river eroding its banks over a one-hundred year period—called a hundred year run. Accordingly, there is a need for a technique that not only provides an exact depiction of the environmental input data, but a technique that will also enable the simulation system to be reconfigured to represent environmental alteration and to permit query of altered environmental conditions after a model run. For education and for assessing potential environmental impact it is useful to be able to visualize the original environmental conditions, changes imposed to initial conditions prior to modeling, and the resultant conditions after competing the model run. Such visualization is assisted by allowing a system user to examine and navigate within a 3-D world model of the environmental region under study.

SUMMARY OF THE INVENTION

The present invention provides a system and method optimized for personal computers for terrain model generation where the simulated land surface is colored and textured based on geographic databases, where natural and man-made 3-D object features can populate the surface, and where a user customization interface is provided to rapidly and efficiently query the system and construct the customized model output in a "user-friendly" fashion.

The method includes the steps of acquiring input data from at least one of a plurality of digital data sources, reading the data, translating the data format if necessary, and transforming the input data into one or more intermediate database formats. The intermediate database formats for terrain elevation data may be extracted directly per direction from a user query to create a generated world model file that is of a particular format optimized for a particular image display software means, such as by browsers compliant with the Virtual Reality Modeling Language specification.

One of the advantages of the invention is that an intermediate database format is created through a pre-processing step in the initial data transformation process that is a composite merger of the surface geographic data layers other than terrain elevation. Vegetation data, road data, waterway data and other environmental data layers are combined into a surface-composite intermediate database format which can be subsequently extracted from to be included in the generated world model file.

It is a goal of the invention to maximize the portability and access efficiency of the intermediate database formats. The first transformation process will generate an intermediate database structure and format for each environmental data type that aims to be more compact than the data format originally acquired and to be more efficiently structured to speed secondary access and extraction.

One of the aspects of the invention is the inclusion in the secondary formatting process that creates the generated world model a series of instructions to populate the colored terrain skin, where appropriate, with 3-D objects that simulate natural and man-made object features, such as trees, rocks, bridges, causeways, dams, radio towers, pipelines, and buildings. This 3-D object population step is accomplished by first creating a 3-D object library, whereby the 3-D objects are built in Virtual Reality Modeling Language or other similar graphical software means, where the objects are themselves appropriately colored and textured to simulate real-world appearances, and where the objects can be instanced singly or repetitively. The 3-D objects are then instanced singly and placed by compositing instructions at a specific geographic coordinate in the generated world file or instanced repetitively within a looping program sequence whereby the objects are placed or not based upon compositing rules that may include a random generator as the program marches sequentially along the rows and columns of the terrain skin. It will be appreciated that other geographic data layers could be included in this compositing step for an appropriate application.

The generated 3-D world model is preferably constructed in the Virtual Reality Modeling Language ("VRML") format, VRML specification 2.0 or higher, with the advantage that this allows numerous combinations of computer platform, operating system, graphical user interface and browser to be employed in using the invention.

Another advantage of the invention is that the terrain elevation and the surface-composite bitmap are maintained as separate blocks of a standard VRML file, VRML specification 2.0 or higher, with the open standard of the VRML viewing technology (such as CosmoPlayer by Silicon Graphics, Liquid Reality by Microsoft, or WorldView by InterVista) creating the merger of the graphical components upon rendering of the scene. This facilitates revision or replacement of the bitmap with a subsequently called bitmap file owing to user activity within the file (i.e., when navigating within the file), where the revised bitmap could be derived from output passed to the intermediate database from an environmental systems model that is coupled by the query processor to the generation of the 3-D world model, or where a revised bitmap might be obtained via the Internet from a remote bitmap or from remote geographic data brought in to revise the bitmap, which Internet acquisition could be triggered by a proximity sensor means that is integral to the VRML 2.0 specification.

Another advantage of the invention derived from generating the 3-D world model in VRML format, VRML specification 2.0 or higher, is that the invention allows the user to take advantage of the built-in hyperlinking and proximity sensor capabilities of the VRML specification. The hyperlinking allows the user to click the mouse while navigating within the 3-D world to bring up multi-media text, or hypertext markup language documents, which documents may be addressed by a universal resource locator ("URL") with the target document being either local to the computing system or remotely accessible through the Internet or World Wide Web. Similarly, proximity sensors can be set to cause an event to occur within the 3-D model world, which event could include an inclusion of a 3-D object, or a hyperlinking event.

Another advantage of the invention derived from generating the 3-D world model in VRML format is that this method enables the generated 3-D world file to be readily edited by an end-user, either in direct text mode through any one of a plurality of ASCII text word processors or in graphical mode by employing any one of a plurality of commercial VRML editing tools, such as 3DSpaceBuilder (Paragraph International, Inc.), CosmoWorlds (Silicon Graphics, Inc.) or EZ3D (Radiance Software, Inc.).

Another advantage of the invention is the graphical user Query Interface, which operates in conjunction with a standard graphical user interface of the personal computer, such as the Microsoft Windows 95 graphical user interface. This query interface enables the user to request in very "user-friendly" fashion a particular geographic region to be the basis for the 3-D world model by entering a zip code or latitude-longitude coordinate, or by specifying geographical corner bounds of the target region.

Further, the query interface enables the user to specify through an interactive window dialog box assorted characteristics of the 3-D world model to be generated in VRML, such as color and vertical exaggeration. Also, the query interface enables the user to rapidly and efficiently specify in a windows dialog box any bitmap file at the users discretion to be merged into the 3-D world model as a terrain skin.

As an additional advantage of the invention, the query interface produces a log file that stores the custom characteristics chosen by the user. A further advantage of the query interface is being able to name the 3-D world model file as the user chooses, including to specify a particular storage path whereby the file is stored to the local hard disk or to removable storage media as the user chooses.

Additional features and advantages of the present invention will be made apparent from a reading of the preferred embodiment which makes reference to the following drawings.

IMPORTANCE AND USEFULNESS

The invention is important to increase public, educational and professional access to real geographic information visualized in 3-D, to reduce the cost of access, to speed access, to make access more "user-friendly", and to generate a 3-D format that is able to be edited easily and able to be used in many differing combinations of personal computer systems.

The invention is useful to students, researchers, government employees, corporate planners, Web-site developers and advertisers, any one of whom may be seeking to create a 3-D world model simulation of the real terrain and environment.

DESCRIPTION OF THE PREFERRED EMBODIMENTS

Figure 1:
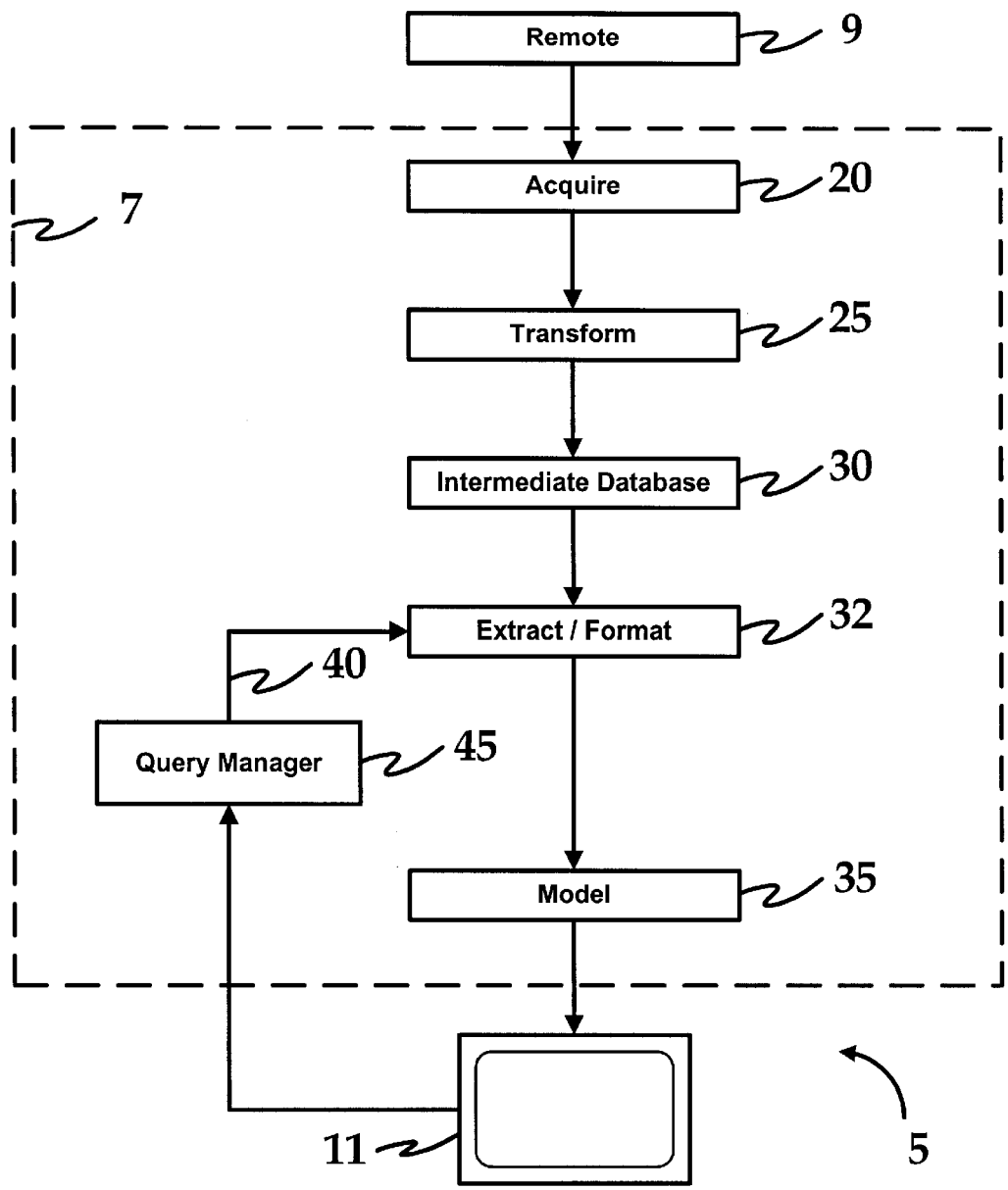
FIG. 1 provides a diagrammatic view of a 3-D world generation system in accordance with the present invention.

Referring now to the drawings in more detail, FIG. 1 diagramatically illustrates the 3-D world model generation system 5 according to the present invention. FIG. 1 includes a large broken-line block 7 that represents the computer that contains the processing software that may be used to create a three-dimensional visual database of a simulated world.

In one embodiment according to the present invention, the computer 7 is an HP Pavilion Pentium PC which utilizes an MS-DOS and Microsoft Windows 95 graphical user interface, with VRML 2.0 viewing enabled through the WorldView VRML 2.0 browser (InterVista Corp.) as a plug-in to Netscape Navigator 3.0 Gold (Netscape Communications Inc.). However, it should be appreciated that other suitable computer systems may be used in the appropriate application.

FIG. 1 also illustrates two external blocks 9 and 11 which represent various sources of input data from which a visual image of a geographic area may be generated. The basic source data may be received in a number of different areal, cartographic, or geographic formats, such as data made available from satellite imagery, aerial photography, U.S. Census Bureau, U.S. Department of Commerce, and from the U.S. Geological Survey.

Block 11 represents the interfacing user's computer monitor, which is the output device for viewing the 3-D world models generated by the invention, and the user's input devices, which are the input pathway for requests made through the interactive graphical user query interface 45. In one embodiment the visual interface is rendered on a 20" Multimedia Plug & Play Color Monitor manufactured by Sceptre Corp.

As shown in Block 20, the source data 9 is acquired via a download from the Internet or by reading from a portable storage media, such as a magnetic disk or an optical compact disk media. As shown in Block 25, these source data 9 are transformed into an intermediate database fie format 30. The intermediate database format 30 will generally include terrain elevation data, vegetative cover data, land use data, resource data, soil data and other surface geological data, cultural data, an object library (for example, 3-D objects for natural and man-made structures), hydrological data, and other utilities or algorithms appropriate to the visual database. In addition, this intermediate database format will generally include one or more composited databases comprised of combinations of one or more of the aforementioned geographic and cultural database types, which composite databases serve as indirect or direct formats for a terrain-skin bitmap database.

Then as illustrated in block 32, data from the intermediate database 30 are extracted and further formatted to create a 3-D world model 35. For example, a small portion of the United States may be extracted from the intermediate terrain elevation database and combined with the appropriately corresponding section of vegetation-type and road databases to yield a generated 3-D world model. In any event it should be understood that the formatting process 32 may be used as part of the process of creating a simulated world from real world source data 9. In this regard, arrow 40 represents that the extraction and formatting process 32 is directed in response to a query step 45, wherein the query is a request from a user interacting with the 3-D world model generation system 5 via the computer monitor 11.

In one form of the invention the formatting step 32 creates 55,000 separate instances of VRML output models as a pre-processed database created before the user loads the software that runs the query interface 45, in which embodiment the query is merely a direction to extract one of the existing models.

In the preferred embodiment, the query step 45 is initiated as a location passed to the extraction and formatting step 32, so that a single 3-D world model 35 is generated only subsequent to delivery of the query instruction 40.

While in the preferred embodiment the format of the 3-D world model is VRML 2.0 or a higher version specification of VRML, it should be appreciated that differing computers and imaging systems could have other formats, such as *.dxf, *.xyz, or other graphical formats used for hard-copy picture output, and these alternatives could be utilized for the 3-D world model output format.

Figure 2:
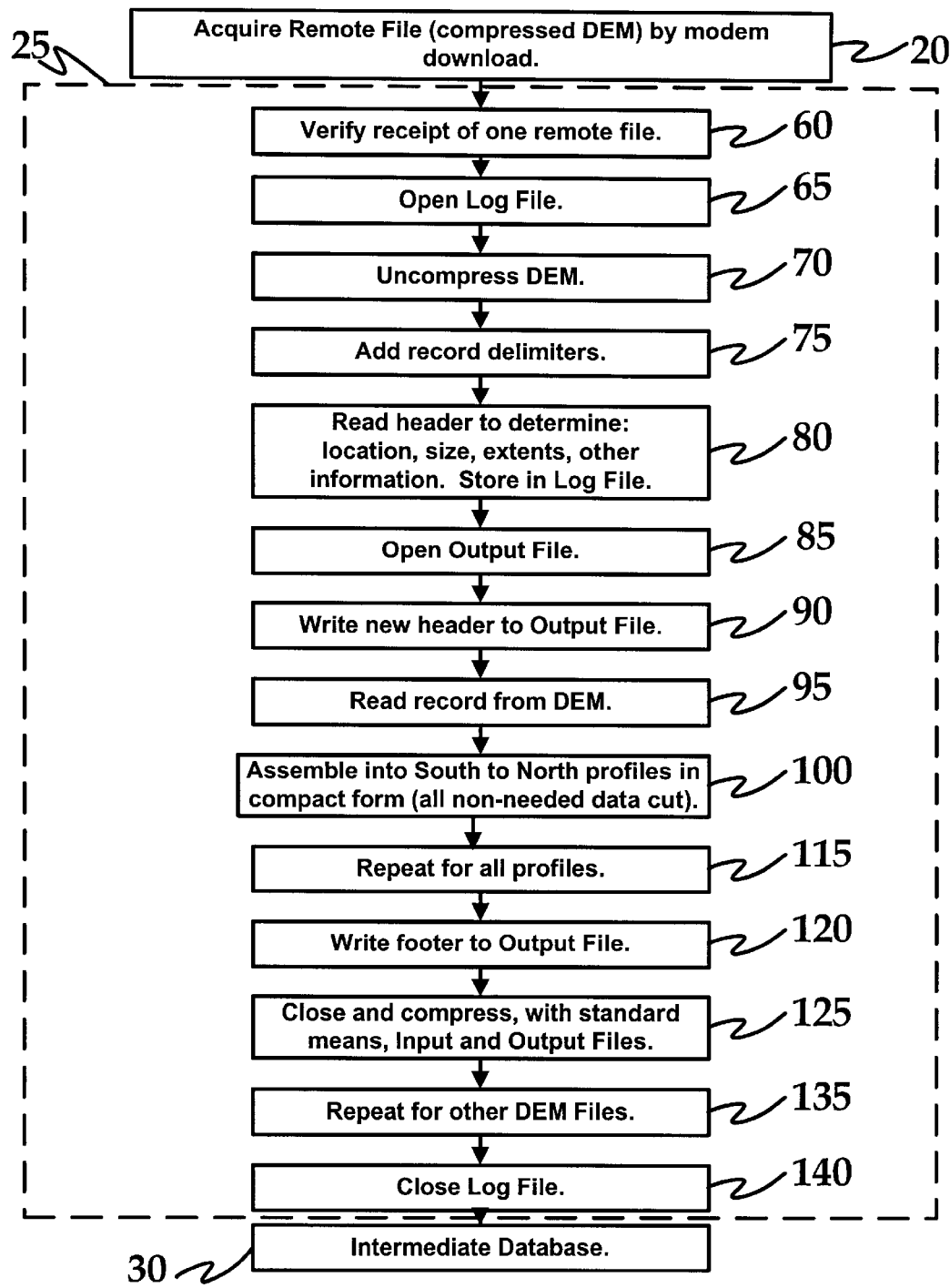
FIG. 2 is a flow-chart of the initial data transformation method for creating the intermediate database format.

Referring to FIG. 2, a flow chart of the transformation block 25 is shown. In this regard, the function of this modular software block is to acquire and input digital source data and to convert it into a standardized intermediate database structure or into a set of intermediate database formats and database files. A modem download 20 via the Internet is the preferred method to access the data source 9, although it should be noted that alternative means are contemplated by the invention, such as input from optical compact disk storage media or magnetic diskette.

The digital data are processed through the data transformation method 25 in a series of steps. In block 60 the system verifies that it has received at least one proper remote data file. Block 65 represents the opening of a log file for storing information about local data. If necessary, each digital elevation model file is uncompressed, as depicted in block 70. For certain digital elevation data files, such as the 3-arc second USGS DEM files utilized in one of the preferred embodiments, the DEM file is modified by adding record delimiters, depicted as step 75. A file header read step 80 determines the specific location, size, extents, and other necessary information relating to the data contained within digital elevation data files, which header information is stored in the log file opened in step 65 to be later used when accessing the local version of the data. An open output file instruction 85 is followed by a write instruction 90 to place a copyright notice and necessary header data in the output file. It should be noted that steps 70–80 may not be necessary for every other geographic database type; where the acquired source data is in a most compact format with a structure enabling efficient access, then the data may be stored in the intermediate database in the same format in which it was acquired.

Block 95 depicts the step of reading a record from the digital source file as modified through step 75. Each record from the data file is read individually. Records are assembled into complete south to north profiles of elevation grid data and than are written as complete profiles to the output file, depicted by step 100. The output data format is an efficient, compressed presentation of the raw data. Only the numerical digits, with no added spaces or line feed characters, are written to the file. The data file header contains the number of digits required to record each elevation for that particular file. For example, if the maximum elevation in a given input file is 335 meters or units, then three digits would be required to represent the maximum value. This format also allows for efficient further compression from ASCII to binary format.

Once a profile is completely written to the output file, the process is repeated with the next profile until all are completed, this iteration being depicted in block 115. Once all of the profiles have been written to the output file, a footer copyright notice is written to the output file, shown as step 120. Then, both the input and output files are closed for access and the program compresses the output file using either a public domain or licensed standard ASCII-to-binary compression algorithm (such as GNU-zip compression), as illustrated in block 125. A looping step 135 is activated if the current input file is not the last file specified for reformatting, causing the series of steps to be repeated starting from step 70 for the next file. Upon the completion of the last file reformat, the log file is then closed for write access, this being step 140. A report of successful completion is returned as the source data are now stored in the new intermediate format 30.

In the preferred embodiment of the invention, the intermediate database format 30 for terrain elevation data is sufficiently compact that the 3-arc second Digital Elevation Model data of the U.S. Geological Survey for the entire contiguous United States is able to reside on two or fewer compact disk optical storage media (CD-ROM), where each storage disk has approximately 650 Mbytes of digital data capacity, and the creation of a generated model file for a terrain surface is completed in fewer than 90 seconds after submission of the user's custom request on a personal computer with a Pentium 133 central processing unit and a double-speed compact disk reading drive. A preferred geographic extent for the intermediate database format for terrain elevation data of the 3-arc-second USGS Digital Elevation Data for the contiguous United States is to store 1 degree latitude by 1 degree longitude of terrain data per intermediate terrain database file.

In the preferred embodiment of the invention, although not shown in FIG. 2, the formatting process 25 to create the set of intermediate database files also includes a geographic data-layer-compositing step that merges geographic data layers to create a terrain-skin composite file that is convertible to a color bitmap file for simulating differing surface colors and textures corresponding to soil, rock, water, vegetation and other natural and man-made surfaces. This compositing is achieved through georegistering the geographic data layers and applying stepwise a series of geographically-sensitive, climate-sensitive and ecologically-sensitive compositing rules and compositing steps whereby: an x,y matrix for a surface geology layer is imposed first upon a first matrix of transparent values; then a georegistered vegetation matrix is overlain to dominate those pixels of the surface geology layer where the compositing rules allow vegetation to grow constrained by geography, climate and ecology; then a georegistered hydrological data layer is overlain whereby ocean, lakes, rivers and streams dominate over the presence of all previous layers; then a georegistered database of roads and other human structures is overlain whereby these surfaces and features dominate over all previous layers. It will be appreciated that other natural and man-made geographic data layers could be included in this compositing step within the formatting process 25 to form the terrain-skin composite file.

The method of creating the terrain-skin composite file in the intermediate database format may be assisted by a standard geographic information system (GIS) means, wherein the GIS means could be a relational database means such as Oracle 8.0 (Oracle, Inc.) that is enabled with Open GIS interoperability standard technology, or wherein the GIS means is one of a plurality of public-domain or commercial geographic information systems such as GRASS (U.S. Government), IDRISI (Clark University) or Arc/Info (ESRI, Inc.).

Figure 3:
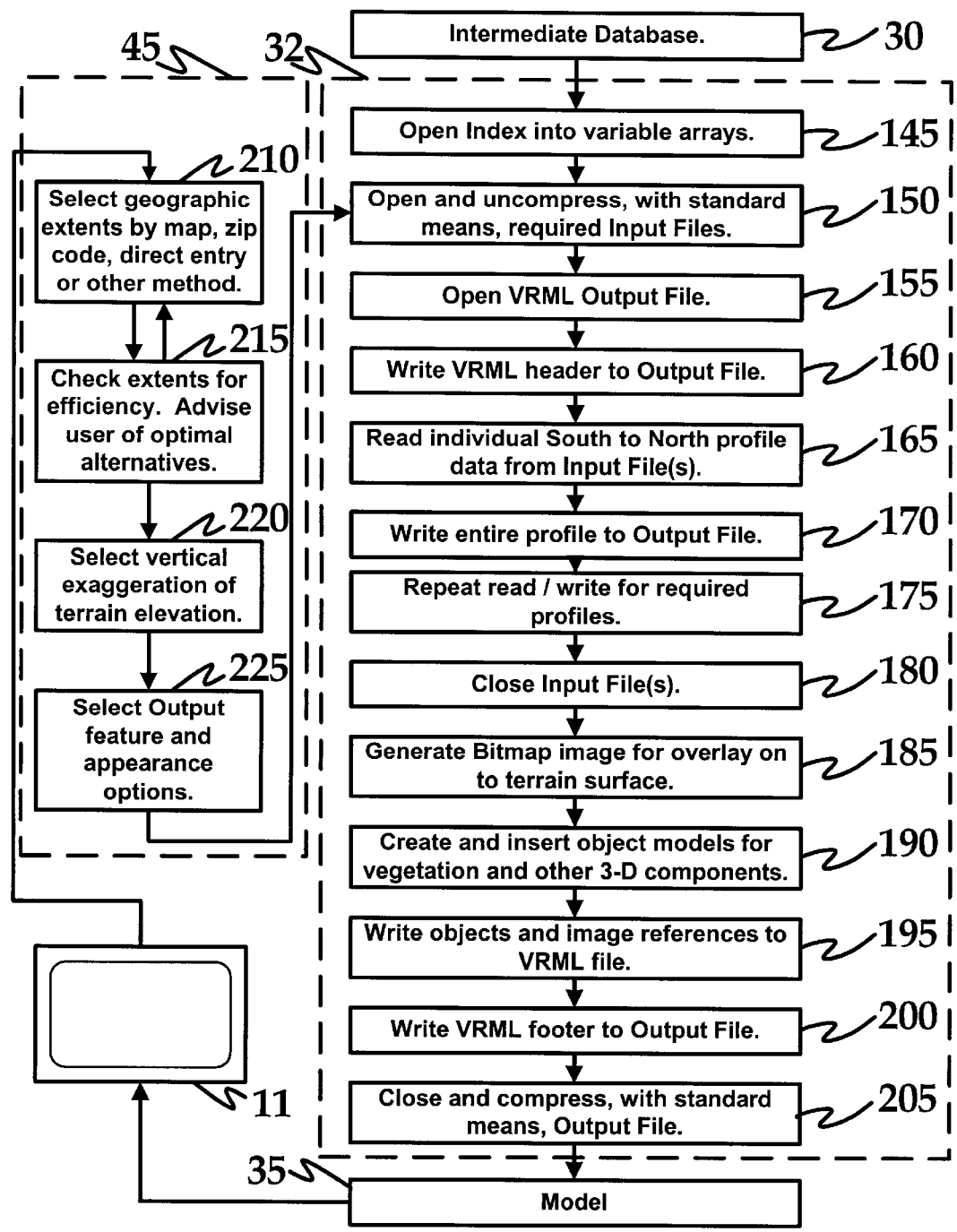
FIG. 3 is a summary flow chart of the graphical user query interface method and the secondary terrain and composite surface extraction and formatting methods that the query processor directs, including the creation of the 3-D world model and the populating of the 3-D world model with 3-D objects.

Referring to FIG. 3, a flow chart of blocks 32 and 45 in detail are shown in greater detail. In this regard, the function of block 32, labeled "Extract/Format," in FIG. 1, is to format and output a 3-D world model file in Virtual Reality Modeling Language (VRML) format 2.0 as directed by a user through the query interface 45, wherein the data are extracted from the intermediate database 30.

The index of the intermediate database is read into variable arrays, shown as step 145, for use in determining the needed files for the desired output. The user selects the geographic extents for the desired output file, depicted as step 210 of the query process, and, after referencing the index array, the topographic data input files that are required to produce the desired output are uncompressed using standard means and are opened for file read access, as depicted in block 150. Four possible data processing conditions exist depending upon user-selected geographic extents: first, all of the desired data can be contained within one input file; second, the data required can be contained within two North-South adjacent files; third, the data required can be contained within two East-West adjacent files; and fourth, the required data can straddle four input files.

The output file which will receive the VR code is opened for writing in step 155. A standard VRML code header is written to the output file with code comments containing file creation time, selected geographic output extents, and other information, shown as step 160.

In all cases, entire South to North profiles are read from either one or two input data files as step 165 and then written to the VRML output file in step 170. This procedure pair, 165 and 170, is repeated until the entire set of required profiles has been written 175. Following completion of topographic data processing, the input file or files are closed for reading 180.

If requested in block 45, a bitmap image is created for application to the terrain surface 185. This method is detailed below and in FIG. 4. Also, if requested in block 45, the VRML terrain scene is populated with 3-D objects at step 190, for example, 3-D vegetation objects which correspond to the actual vegetation at the selected location. This method is detailed below and in FIG. 5.

Following completion of the methods in blocks 185 and 190, image references and objects are written to the VRML output 195. Footer code is written to the output file which contains closing VRML statements, copyright and software version comments, and other information 200. VRML output file is then closed for writing and compressed using standard means as per the VRML specification, as illustrated at step 205.

The produced VRML output file 35 can then be viewed using standard modeling and model viewing tools designed to accept VRML code as input. This system provides for display of the output in an interactive environment using computer screens and input devices 11.

Additionally, following viewing of the model VRML data, a user is prompted and aided by a graphical user interface which guides the user through another selection iteration 45. The graphical user interface is available is several formats including a widows-based step-by-step wizard, a series of standard Common Gateway Interface form/code files accessible via standard Internet and Intranet Internet Protocol/Transmission Control Protocol (TCP/IP) protocols, and by other interfaces. A user selects the desired geographical extents selection of the VRML output file using one or several of the following: direct entry of points, selection on a scaleable map, by zip code or city/state name combination, or other method at step 210. The selection function provides the user with a default optimized selection as well as optimized selections about single points selected through maps and by place names and zip codes. The optimized selection can be overridden by the user, but there is a feedback system at step 215 which advises the user on the impact of their selection in terms of file creation speed, and efficiency and usability of VRML output.

The user then is prompted for selection of vertical exaggeration of output data if desired at step 220 and for selection of appearance and other output options at step 225. Once complete, the information is passed back to block 150 for creation of VRML output as per the query specification 45. If the user selects the bitmap image overlay option at step 225 of, then the method in block 185 detailed in FIG. 4 is activated.

Figure 4:
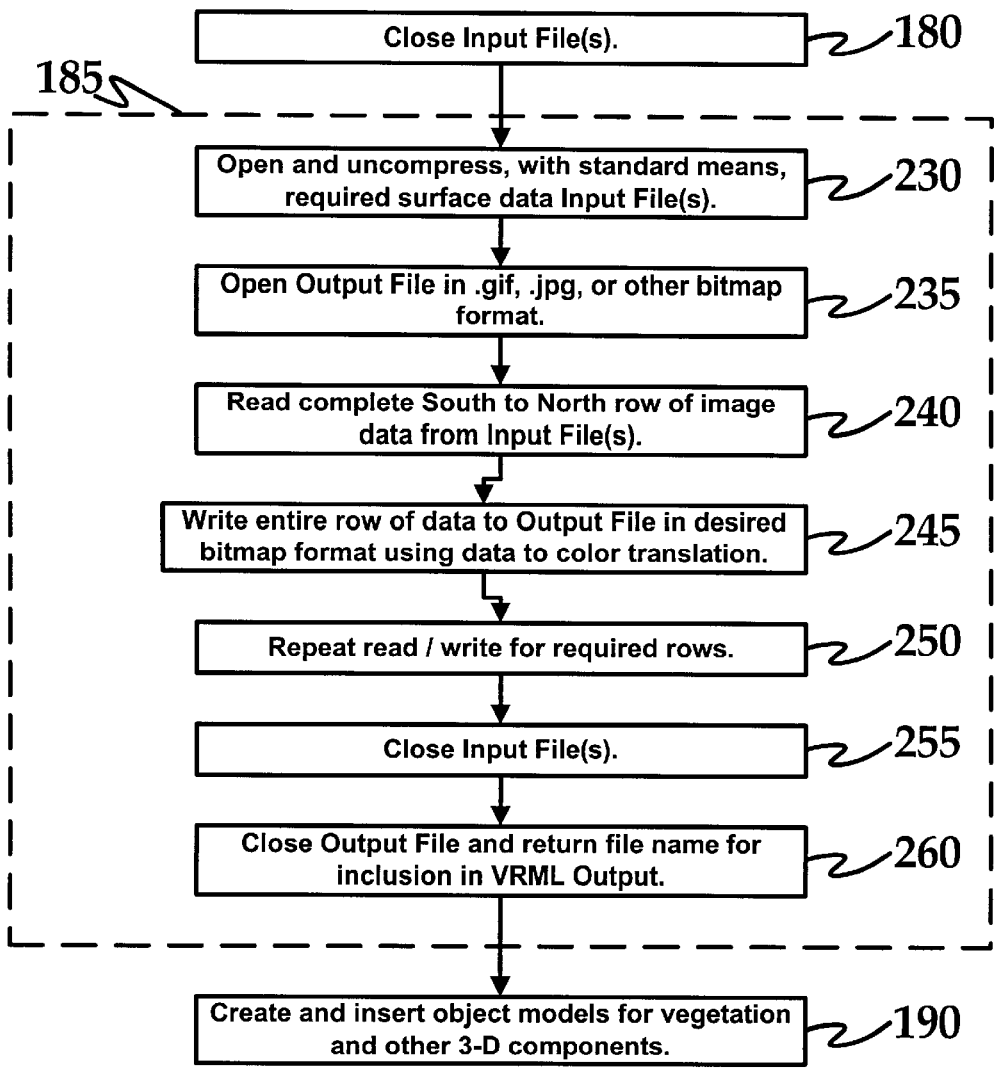
FIG. 4 is an expanded detail of the FIG. 3 flow chart for the step of generating the bitmap image for overlay on to the terrain surface, this image also being referred to as the terrain-skin.

Referring to FIG. 4, depending upon the user-selected geographic extents of the intended output file made at step 210 shown in FIG. 3, and after referencing the index array, the surface data input file or files that are required in order to produce the desired bitmap output are uncompressed using standard means and opened for file read access at step 230. These may include the terrain-skin composite file or files in the intermediate database format. As described above in steps shown in FIG. 3 for assembling terrain data file, up to four input files may be required.

The output file in either graphic interchange format (gif), jpeg (jpg), or other VRML compatible format is opened for writing at step 235. An entire South to North row of surface data is read from input file or files at step 240. Following, the entire row of data is written in the appropriate graphics format in step 245. These two steps 240, 245 are repeated until the file for the selected geographic extents has been written, as depicted at step 250. The input file or files are closed for reading at step 255. At step 260 the output file is closed for writing and the name of the output bitmap file is returned to the process 32 for inclusion in the generated 3-D world model file. Step 190 represents the continuation of the process 32, as shown in FIG. 3, following the completion of block 185.

Figure 5:
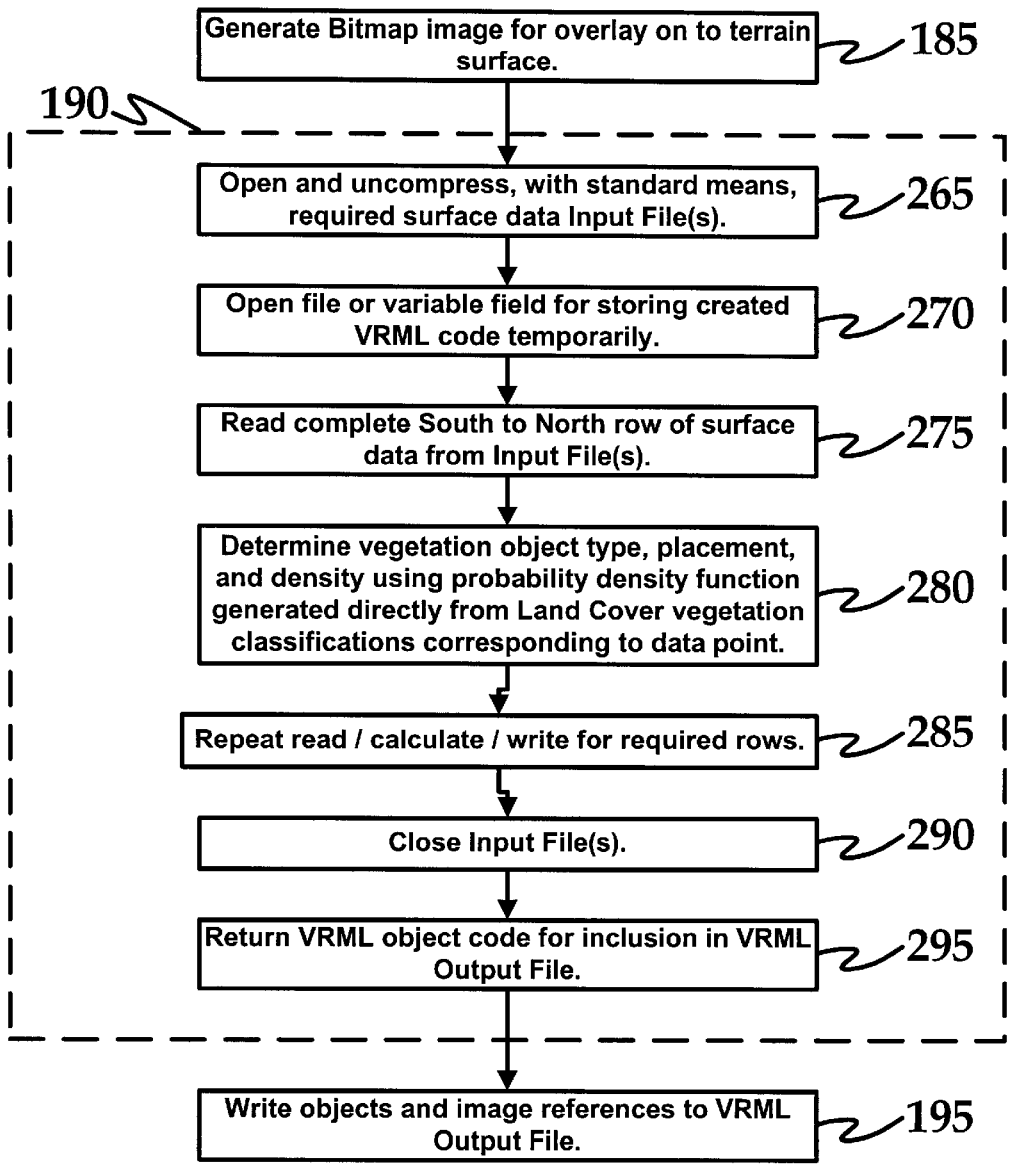
FIG. 5 is an expanded detail of the FIG. 3 flow chart for the step of creating and inserting 3-D object models for vegetation and other 3-D features.

Referring momentarily again to FIG. 3, if during the query formulation process 45 the user chooses at step 225 to activate the option for populating the 3-D world model with 3-D objects, then the method in block 190 will be activated as detailed in FIG. 5.

Referring to FIG. 5, depending upon the user-selected geographic extents of the intended output file made at step 210 shown in FIG. 3, and after referencing the index array, the surface data input file or files that are required in order to produced the desired object-populated output are uncompressed using standard means and opened for file read access at step 265. These may include certain 3-D object files that are accessed as source data and stored in an object library database as part of the intermediate database. As described above in steps shown in FIG. 3 for assembling the output terrain model from intermediate data files, up to four input files may be required. At step 270 either a temporary file is opened or random-access memory variable space is declared for temporarily storing VRML code to be created within the remaining steps of block 190.

An entire South to North row of surface data is read from input file or files at step 275.

Next, at step 280, the datum from the surface data file at a geographic location point specifies the appropriate spatial density as a percentage cover for one or more 3-D object types, such as trees or buildings. A random value between zero and one is obtained from the computer and is compared to the spatial density value for the first object type. If the random value is in the pass range, i.e., the random value is not more than the spatial density value for the first object type, then the appropriate 3-D modeling object from the 3-D object library is placed at that point. With only one object type, if the value is greater than the spatial density value for the first object type then no object is placed at that point. In general, with multiple objects, after the test for placement of the first object type, if the random value is greater than the sum of the spatial densities for the previously tested object types for this location and not more than that sum plus the spatial density for the object type currently being tested, then the appropriate 3-D modeling object for the current object type from the 3-D object library is placed at that point. With multiple objects, if iterative testing leads to no placement, then the process moves on to the next geographic location point.

These two steps 275, 280 are repeated until the VRML code for the selected geographic extents has been completed at step 285. The input file or files are closed for reading at step 290. At step 295 the output VRML code is returned to block 32 for inclusion in the output file which is created at step 195.

A sample VRML file supporting 3D model 35 for terrain found at 40.51 degrees North latitude, 111.51 degrees West longitude is listed on the attached Sample.

```
#VRML V2.0 utf8
#   Copyright 1996–7, GeoSoftware, Inc.
#   All rights reserved. Use of this file subject to license.
#   Find GeoSoftware at http://www.geosoftware.com on the
    World-Wide-Web.
#   This header may not be removed from this file.
```

-continued

```
#   See the license for more information.

#   This VRML 2.0 file represents the actual terrain found at
#       40.510 degrees North, 111.510 degrees West
#           to 40.505 degrees North, 111.505 degrees West.

#   File Generated: 8/26/97 11:59:05 AM

Group
        children [
        Shape
            appearance Appearance
                material Material
                    diffuseColor 0.8 0.8 0.8 geometry ElevationGrid
                xDimension 7
                zDimension 7
                xSpacing 92.5
                zSpacing 74.0
                solid FALSE
                creaseAngle 0.785
                height [
2072,
2072,
2072,
2072,
2072,
2072,
2072,
2072,
2072,
2058,
2053,
2072,
2072,
2072,
2072,
2072,
2047,
2035,
2040,
2041,
2050,
2060,
2046,
2022,
2011,
2011,
2011,
2028,
2025,
2011,
1997,
1992,
1994,
2011,
2016,
1994,
1981,
1963,
1961,
1963,
1979,
1993,
1966,
1950,
1946,
1938,
1936,
1944,
1950
                ]
        ,
        Transform
            translation 35 3535 0.0
            rotation 0.0 0.0 1.0 –1.5708
```

-continued

```
            children [
                Shape
                    appearance Appearance
                        material Material
                            diffuseColor 1 0 0 geometry Cone
                        bottomRadius 50
                        height 70

]

#   Use of this file restricted by license.
    #   GeoSoftware Terrain Traveler 0.2b20. Get the real terrain!
```

What is claimed is:

1. In a computer system having (i) a digital processor, (ii) working memory and (iii) input/output units including input means and a display monitor, a terrain model rapid generation system, comprising:

an intermediate data file holding indications/representations of elevation vertices;

an extractor and formatter responsive to user input and loosely coupled to the intermediate data file for extracting a subset of vertices from the intermediate data file, combining these vertices into an array and formatting said array into an output specification for a three-dimensional geometric configuration, said specification supporting display of a three-dimensional world model including geographic terrain details; and a user interface coupled to the extractor and formatter for enabling user input of instructions through the input means, said instructions directing the extractor and formatter;

wherein the digital processor executes the extractor and formatter and user interface in the working memory to generate and display the three-dimensional world model through the display monitor for user viewing.

2. A terrain model rapid generation system as claimed in claim 1 further comprising a translator coupled to the intermediate data file, the translator for translating elevation vertices in input files from a standard United States government format into a format of the intermediate data file.

3. A terrain model rapid-generation system as in claim 2, wherein the extractor and formatter further merge a plurality of input files to produce a single output file of different extent than any one of the input files, said output specification being formed of the output file.

4. A terrain model rapid generation system as claimed in claim 1 further comprising:

means for acquiring remote terrain data files; and a transformer coupled between the acquiring means and the intermediate data file for transforming acquired remote terrain data files into the intermediate data file.

5. A terrain model rapid generation system as claimed in claim 1 wherein the user interface enables user input of latitude and longitude coordinates of a centering point and latitude and longitude areal extent about said center point; and wherein the extractor and formatter generate a specification that supports display of a three-dimensional model of said longitude and latitude coordinate centering point and surrounding area, including geographic terrain details of said area.

6. A terrain model rapid generation system as claimed in claim 1 further comprising:

a query manager subsystem coupled between the user interface and the extractor and formatter, the query manager subsystem defining the subset of vertices to be extracted from the intermediate data file.

7. A terrain model rapid-generation system as in claim 6, wherein said query manager subsystem includes means for overlaying a bitmap image upon the displayed 3D world model.

8. A terrain model rapid-generation system as in claim 6, wherein said query manager subsystem further creates and inserts computer programming objects that simulate 3D real-world objects, including color and texture for simulating real-world appearances, for installation upon the displayed 3D world model.

9. A terrain model rapid-generation system as in claim 6, wherein said query manager subsystem further selects a specified location.

10. A terrain model rapid-generation system as in claim 6, wherein said query manager subsystem further selects output features and appearance of surface of the terrain.

11. A terrain model rapid-generation system as in claim 6, wherein said query manager subsystem further selects vertical exaggeration.

12. A terrain model rapid-generation system as in claim 1, wherein format of the output specification is one of OpenFlight, VRML 2.0, *.xyz, *.obj, *.3ds, *.dxf, *.dgn, and *.pgn.

13. A terrain model rapid-generation system as in claim 1, wherein the user input instructions include location and extents specified by one of a conventional GIS (Geographic Information System) means and a GPS (Geographic Positioning System) means.

14. A method for rapidly generating a computer-based terrain model comprising the steps of:

providing computing means including an intermediate database of terrain vertices;

using a query manager executed by the computing means, extracting a set of terrain vertices from the intermediate database based on a latitude-longitude center location and geographic extents, the extracted set of terrain vertices corresponding to said latitude-longitude center location and geographic extents; and constructing a three-dimensional world model format instruction based on the extracted terrain vertices, said constructed instruction supporting display of a three-dimensional terrain model of a geographic area defined by said latitude-longitude center location and said geographic extents.

15. A method for rapidly generating a terrain model as in claim 14, further comprising:

rendering from the format instructions an image of the three-dimensional model, and displaying said image.

16. A method for rapidly generating a terrain model as in claim 15, further comprising:

implementing format instructions for building a 3D model in at least one of the formats of "*.3ds", "*.dxf", "*.obj", "*.dgn", "*.png", "*.max", "*.wrl", "*xyz", "OpenFlight", and "LightWave".

17. A method for rapidly generating a terrain model as in claim 14, further comprising:

writing the three-dimensional world model format instruction to a file on a storage disk.

18. A method for rapidly generating a terrain model as in claim 17, further comprising:

implementing format instructions for building a three-dimensional model in at least one of the formats of "*.3ds", "*.dxf", "*.obj", "*.dgn", "*.png", "*.max", "*.wrl", "*xyz", "OpenFlight", and "LightWave".

19. A method for rapidly generating a terrain model as in claim 14, wherein said intermediate database is greater in latitude extent than one degree latitude and/or is greater in longitudinal extent than one degree of geographic data.

20. A method for rapidly generating a terrain model as in claim 14, wherein the intermediate database comprises "3-arc-second" USGS terrain data for the 48 contiguous states on less than about 1300 Mbytes.

21. A method as claimed in claim 20 further comprising the step of merging a plurality of input files from a standard U.S. government format of the terrain data to produce a single output file of different geographic extent than any one of the input files, said constructed instruction being formed of the output file.

22. A method for rapidly generating a terrain model as in claim 14 wherein the extracting and constructing of a three-dimensional world-model format instruction is accomplished by the computing system in less working time than the time required for accessing and building similar output from an original terrain data source file.

23. A method for rapidly generating a terrain model as in claim 14, further comprising:

preparing any two-dimensional image in a geographic information system; and applying said two-dimensional image via one of a standard format of "*.bmp", "*.jpeg", "*.gif", and "*.tiff" to the terrain surface as a terrain skin.

24. A method for rapidly generating a terrain model as in claim 14, further comprising:

creating a library of three-dimensional objects described and stored in object-oriented computer programming code;

instancing the computer code objects singly or repeatedly within the 3D terrain model;

coloring and texturing the instances of computer code objects to simulate real-world appearance; and placing the colored and textured objects in the three-dimensional terrain model at specific geographic coordinates.

25. A method for rapidly generating a terrain model as in claim 23, further comprising:

revising the two-dimensional image based on movement of a user's viewpoint during navigation within the three-dimensional terrain model, such revising including updating format instructions from an environmental systems model coupled to the query manager.

26. A method for rapidly generating a terrain model as in claim 23, wherein the two-dimensional image is downloaded from the Internet, World Wide Web or combination of WWW calls assisted by a geographic information system interface.

27. A method for using a rapidly generated computer-based terrain model to visualize geographic locations and navigate through simulations of the geographic locations, comprising the steps of:

accessing an intermediate database through a query manager interface to extract elevation vertices of a desired geographic location;

converting the extracted elevation vertices into a three-dimensional world terrain model in a specified output format;

navigating through an image of the three-dimensional world terrain model using a standard WWW browser interface; and hyperlinking from within the three-dimensional world terrain model via a universal resource locator address.

28. A method for using a rapidly generated terrain model as in claim 27, further comprising:

exporting output models in a specified format to a conventional three-dimensional model authoring tool for enhancing and/or revising the three-dimensional world terrain model; and revisualizing the revised three-dimensional world terrain model in a computer display device.

29. A method for using a rapidly generated terrain model as in claim 27, further comprising:

choosing a surface color for the output format of the three-dimensional world terrain model from a selection of multiple alternative choices presented by the query manager.

30. A method for using a rapidly generated terrain model as in claim 27, further comprising:

choosing an appropriate vertical exaggeration for the elevation vertices as desired by the user.

31. A method for using a rapidly generated terrain model as in claim 27, further comprising:

choosing a two-dimensional image to be overlayed on the surface of the three-dimensional world terrain model, and merging the two-dimensional image onto the three-dimensional world terrain model surface within the output format.

32. A method of populating a three-dimensional terrain model surface with three-dimensional computer objects based upon a percentage of spatial density for each object type, comprising:

starting at a geographic point on a given model surface, to evaluate for placement of one or more three-dimensional object types;

for one or more three-dimensional object types of an available three-dimensional object library, specifying as a percentage an appropriate spatial density corresponding to said geographic point or geographic region containing said point;

obtaining a random value between zero and one;

comparing the random value to the spatial density specified for a first object type;

placing a first three-dimensional object of the first object type at a point on the given model surface if the random value is not greater than the spatial density for said first object type;

placing subsequent three-dimensional object types if the random value is greater than the sum of the spatial densities for the previous object types and not more than that sum plus the spatial density for the current object type; and advancing to a subsequent geographic point within the model surface for the next evaluation cycle.

33. A method of populating a three-dimensional terrain surface with three-dimensional computer objects based upon percentage spatial density for each object type as in claim 32, wherein the three-dimensional object types are trees, rocks, building or other natural or manmade objects.

* * * * *